United States Patent [19]

Lailach et al.

[11] 3,926,615

[45] Dec. 16, 1975

[54] PRETREATMENT OF TITANIUM-IRON ORES

[75] Inventors: Günter Lailach; Jakob Rademachers, both of Krefeld, Germany

[73] Assignee: Bayer Aktiengesellschaft, Leverkusen, Germany

[22] Filed: July 9, 1973

[21] Appl. No.: 377,863

[30] Foreign Application Priority Data

July 15, 1972 Germany.......................... 2234844

[52] U.S. Cl. .............................. 75/3; 75/1; 423/72
[51] Int. Cl.² .................. C22B 1/14; C22B 34/12; C01G 23/08
[58] Field of Search ......... 75/1, 3; 423/72, 608, 610

[56] References Cited

UNITED STATES PATENTS

| | | | |
|---|---|---|---|
| 3,252,787 | 5/1966 | Shiah ..................................... | 75/1 |
| 3,257,198 | 6/1966 | Volk ...................................... | 75/1 |
| 3,264,091 | 8/1966 | Ban........................................ | 75/4 X |
| 3,457,037 | 7/1969 | Aramendia et al. ................. | 75/1 |
| 3,502,460 | 3/1970 | Martin et al. ....................... | 75/1 |
| 3,597,189 | 8/1971 | Sinha et al. ......................... | 75/1 |
| 3,660,029 | 5/1972 | Naguib ................................. | 75/1 X |
| 3,739,061 | 6/1973 | Stickney et al. .................... | 75/1 |
| 3,764,651 | 10/1973 | Henkel ................................. | 75/1 |
| 3,803,287 | 4/1974 | Fukushima et al. ................. | 75/1 |

FOREIGN PATENTS OR APPLICATIONS

| | | | |
|---|---|---|---|
| 215,866 | 7/1958 | Australia............................... | 75/1 |
| 571,361 | 10/1958 | Belgium................................. | 75/1 |
| 1,041,021 | 10/1958 | Germany................................ | 75/1 |

OTHER PUBLICATIONS

Chem. Abs., Vol. 64, 1966, (1690e), M. Leone.
Chem. Abs., Vol. 72, 1970, p. 329, 137057e.

Primary Examiner—Allen B. Curtis
Attorney, Agent, or Firm—Burgess, Dinklage & Sprung

[57] ABSTRACT

In the production of a titanium dioxide concentrate from a titanium-iron ore wherein the ore is oxidized in a pretreatment, thereafter reduced to form metallic iron in association with titanium dioxide or activated ilmenite and thereafter leached to remove iron and leave a titanium dioxide concentrate, the improvement which comprises effecting the oxidation by first forming unhardened agglomerates of the titanium-iron ore, heating the unhardened agglomerates to a temperature of up to about 900°C, at least the heating from about 600° to 900°C being effected under non-oxidizing conditions, and thereafter heating said agglomerates at a temperature in the range of about 900° to 1200°C under oxidizing conditions until substantially all the iron has been converted into a ferro pseudobrookite-pseudobrookite mixed phase. Preferably, the oxidation is carried out with a flue gas containing about 7 to 13 volume percent of oxygen and more than 0.1 volume percent of water at a temperature of about 950° to 1100°C, oxidation being continued until the ratio of trivalent iron to total iron is at least about $$\frac{5.72a-2}{4.29a}$$

in which $a$ is the ratio by weight of iron to titanium dioxide in the ore, the agglomerates being oxidized in admixture with about 1 to 5 percent by weight of carbon-containing material.

12 Claims, No Drawings

PRETREATMENT OF TITANIUM-IRON ORES

This invention relates to a process for the decomposition of titanium iron ores in which the ores are preoxidized with formation of a ferropseudobrookite-pseudobrookite mixed phase and rutile. To produce $TiO_2$ pigments titaniumiron ores such as ilmenites are usually pretreated in an oxidizing atmosphere, followed by reduction to convert the iron to metallic state and the titanium to titanium dioxide and/or to ilmenite, and the iron is then leached away. Natural ilmenites are particularly suitable starting materials for the process. Naturally occurring ilmenites vary widely in their composition; their titanium dioxide content may easily vary from 20 percent up to about 75 percent. In contrast to pure mineral "ilmenite" $FeTiO_3$, these naturally occurring ilmenites may already contain part of their iron in the trivalent state and sometimes a small proportion may be in the form of pseudobrookite.

It has been found that ilmenite can be reduced particularly rapidly and economically to metallic iron and titanium dioxide if the iron is converted substantially completely into a ferropseudobrookite-pseudobrookite mixed phase during a preliminary oxidizing treatment.

Oxidation with formation of a ferropseudobrookite-pseudobrookite mixed phase may be represented in a simplified form by equation (1):

1. $3/2\ FeTiO_3 + 1/4\ O_2 \rightarrow (FeTi_2O_5)_{0.5}(Fe_2TiO_5)_{0.5}$

This mixed phase may be converted into pseudobrookite and rutile in the course of further oxidation in accordance with equation (2):

2. $(FeTi_2O_5)_{0.5}(Fe_2TiO_5)_{0.5} + 1/8\ O_2 \rightarrow 3/4\ Fe_2TiO_5 + 3/4\ TiO_2$ Other conditions being equal, the time required for reduction of an oxidized ilmenite which consists substantially of a ferropseudobrookite-pseudobrookite mixed phase is only about 60 – 75 percent of that required for oxidized ilmenite consisting of an ilmenite-haematite mixed phase and rutile. In the oxidation of ilmenite carried out by the process of the known art, haematite ($Fe_2O_3$) is formed substantially in accordance with equation (3):

3. $FeTiO_3 + 1/2\ O_2 \rightarrow Fe_2O_3 + 2\ TiO_2$

The shortening of the reaction time required for reduction is particularly important when reduction is carried out at relatively low temperatures, at which the risk of reduction of the $TiO_2$ and sintering of the reduced ore is slight.

It is an object of the present invention to provide a pretreatment of a titanium-iron ore which converts the ore to ferropseudobrookite-pseudobrookite mixed phase so as to permit the subsequent reduction to metallic iron to proceed rapidly.

These and other objects and advantages are realized in accordance with the present invention pursuant to which the pretreatment of a titanium-iron ore is effected by first forming unhardened agglomerates of the titanium-iron ore, heating the unhardened agglomerates to a temperature of up to about 900°C, at least the heating from about 600° to 900°C being effected under non-oxidizing conditions, and thereafter heating said agglomerates at a temperature in the range of about 900° to 1200°C under oxidizing conditions until substantially all the iron has been converted into a ferropseudobrookite-pseudobrookite mixed phase.

In order to obtain the more suitable ferropseudobrookite-pseudobrookite mixed phase and rutile and not the ilmenitehaematite mixed phase which reacts more slowly in the reduction process, it is preferred to observe the following conditions during the oxidation of the titanium-iron ore agglomerates:

1. Oxidation is carried out at about 950° to 1100°C.
2. Oxidation is continued until the ratio of trivalent iron to total iron is greater than about $$\frac{5.72a-2}{4.29a}$$

in which $a$ is the ratio by weight of iron to titanium dioxide in the ore.

3. When ores which do not contain pseudobrookite are oxidized, gases are used which contain more than 0.1 volume percent of water in addition to oxygen.

If these conditions are fulfilled, the reaction time for converting at least 90 percent of the iron into the ferropseudobrookite-pseudobrookite mixed phase is determined mainly by the rate of chemical oxidation of the iron and hence by the rate of oxygen supply. At 1100°C, for example, oxidation may be carried out in 15 minutes on a sintering bath.

The unhardened titanium-iron ore agglomerates of about 1 to 30 mm in diameter may be prepared in accordance with U.S. Patent Application Ser. No. 220,677, filed Jan. 25, 1972, now U.S. Pat. No. 3,823,008, the disclosure of which is incorporated herein by reference. The unhardened titaniumiron ore agglomerates may contain iron compounds and/or titanium compounds and/or material which contains carbon. The addition of iron compounds and/or titanium compounds may be 0.04 to 30 percent by weight and the addition of material which contains carbon may be from 0.1 to 2.5 percent by weight, preferably 0.5 to 1.5 percent by weight, based on the weight of the ore in accordance with U.S. Patent Application Ser. No. 220,677 referrred to hereinabove. The carbonaceous material incorporated in the titanium-iron agglomerates preferably consists of ground coal, coke or tar pitch with a low gas content and particle sizes below 40 $\mu$. The additives mentioned above function as binders in the unhardened agglomerates.

Oxidation and hardening of these unhardened titanium-iron ore agglomerates will now be described more fully with reference to two preferred embodiments.

According to the first embodiment of the process, the unhardened titanium-iron ore agglomerates mixed with carbonaceous material are placed on a sintering belt. The particles of carbonaceous material should preferably have the same size as the agglomerates. We have found the quantity of carbonaceous material should be about 0.5 to 10 percent by weight, preferably about 1 to 5 percent by weight (based on the weight of unhardened titanium-iron ore agglomerates). Granulate coal or coke having a low gas content is preferably used and distributed between and on the agglomerates when the sintering belt is being charged.

After passing of the sintering belt through a drying region and optionally through an initial heating region in which the temperature should not exceed about 500° to 600°C, the material enters the actual heating region, i.e. zone, wherein the iron of the agglomerates is converted into a ferro pseudobrookitepseudobrookite mixed phase. In this region gas, preferably flue gas, at temperatures of about 900° to 1200°C and with oxygen contents of about 7 to 13 volume percent is sucked through the granular material. The flue gas may be produced e.g. by burning gaseous or liquid hydrocarbons, in particular natural gas, with excess air. So long as carbonaceous material is still present in a certain zone of the granular material, it is burned by the excess oxygen in the flue gas, and the ilmenite is thereby further preheated to the required minimum reaction temperature of about 900° to 1200°C, preferably about 950° to 1100°C, under non-oxidizing conditions. The oxygen-free flue gas leaving the zone in which the carbon has just been burnt preheats the next still carbon containing zone without oxidizing the ilmenite. Uniform distribution of temperature in the charge of the sintering belt can be ensured by suitably distributing the coal in the charge and placing an additional layer of coal on the charge. When the coal has been burnt, the ilmenite which has been preheated under non-oxidizing conditions to the reaction temperature is oxidized to ferropseudobrookite-pseudobrookite mixed phase and rutile by the oxygen-containing flue gas which is at a temperature of about 900° to 1200°C, preferably about 950° to 1100°C.

In this embodiment, therefore, a flame front (flame front is the zone where the carbon will just burn) vertically migrates through the bulk of granular material, preceded by a zone of non-oxidizing gases, resulting from the burning process in said flame front. This flame front follows the oxidation zone proper (oxidation zone is the zone in which the carbon has already been burnt) in which the formation of the ferro-pseudobrookite-pseudobrookite mixed phase takes places in the presence of the hot, oxygen containing flue gases. The zones described here are therefore not stationary zones but zones which travel vertically through the granular material.

In the second embodiment of the process, the titaniumiron ore agglomerates, preferably free from carbon, are placed on a sintering belt. When the agglomerates on the sintering belt have passed through a drying region and optionally an initial heating region under temperature conditions similar to those described with reference to the first embodiment, they move on the sintering belt into an adjacent zone in which they are heated in a non-oxidizing atmosphere up to the temperature of 900°C which is required for the formation of ferropseudobrookite-pseudobrookite. The hot agglomerates thereafter move on the sintering belt into another zone, wherein they are oxydized with oxygen-containing flue gas at temperatures of 900° to 1200°C, preferably 950° to 1100°C, to form the ferropseudobrookite-pseudobrookite mixed phase.

The hot, hardened agglomerates may advantageously be introduced directly into the reduction furnace to be reduced in known manner to metallic iron and titanium dioxide or to activated ilmenite and thereafter leached.

EXAMPLE 1:

In an experimental sintering belt plant ilmenite granular material is hardened by oxidation is accordance in the second embodiment according to the invention. To produce the green pellet, South African ilmenite sand, which had an Fe (II) content of 29 percent by weight, and Fe (III) content of 7 percent by weight and a mean particle size of 105 $\mu m$, was shaped with 3 percent by weight of $TiO_2$ in the form of slurry from the titanium sulfate hydrolysis on a granulating plate whilst moistening with water to produce granulated material of 3 - 8 mm. The granular material was placed onto the sintering belt having a width of 90 cm at a height of 30 cm. In the drying region the green pellets were dried with gas at a temperature of 200°C from the initial heating region. By movement of the belt the pellets were conveyed to the initial heating region where they were heated with oxidizing flue gas (approximately 5 volume % of $O_2$) up to a temperature of approximately 550° C. The flue gas was obtained by mixing the reducing spent gas from the heating region with air. The pellets were conducted from the initial heating region into an adjacent zone and heated there with reducing flue gas (produced by combustion of natural gas with 10 percent air deficiency) to approximately 900°C. Thereafter the granular material passed into the oxidation region, where for 30 minutes the bivalent iron was oxidised to trivalent iron with flue gas which contained 14 volume percent of $O_2$ and was obtained by combustion of natural gas with air heated in the cooling region. The temperature of the granular material rose over this period to 1070°C. The pellets were cooled in the cooling region with fresh air. According to the X-ray diagram they only contained pseudobrookite and rutile. The Fe-(III) content amounted to 97 percent of the total iron content. The compression strength amounted on average to 48 kg/pellet.

EXAMPLE 2: (COMPARISON EXAMPLE)

Pellets were prepared according to the known method of procedure, by hardening the same green pellets in the same experimental plant as in Example 1. In contrast to Example 1, however, heating in the heating region was carried out with oxidizing flue gas (approximately 11 volume percent of $O_2$) and not with reducing gas. A sample taken from the end of the heating region contained only 14 percent of the iron as bivalent iron. It was determined by X-ray method that the pellets consisted of an ilmenite-haematite mixed phase and rutile. The compression strength amounted on average to 49.5 kg/pellet.

After the pellets had been heated as in Example 1 with strongly oxidising flue gas in the oxidization region to approximately 1050°C and cooled in the cooling region with air, the Fe(III) content amounted to 97.8 of the total Fe content. It was determined by X-ray method that about a one-third of the iron was bonded as pseudobrookite $Fe_2TiO_5$ and about two-thirds as haematite $FeO_3$. The strength of the pellets amounted on average to only 23 kg/pellet.

It will be appreciated that the instant specification and examples are set forth by way of illustration and not limitation, and that various modifications and changes may be made without departing from the spirit and scope of the present invention.

What is claimed is:

1. In the production of a titanium dioxide concentrate from a titanium-iron ore wherein the ore is oxidized in a pretreatment, thereafter reduced to form a metallic iron in association with titanium dioxide or activated ilmenite and thereafter leached to remove iron and leave a titanium dioxide concentrate, the improvement which comprises first forming unhardened agglomerates of the titanium-iron ore, heating the unhardened agglomerates to a temperature of up to about 900°C, at least the heating from about 600° to 900°C being effected under non-oxidizing conditions thereby to avoid formation of hematite, and thereafter effecting said oxidation of the ore by heating said agglomerates at a temperature in the range of about 900° to 1200°C under oxidizing conditions until substantially all the iron has been converted into a ferro pseudobrookite-pseudobrookite mixed phase.

2. The process according to claim 1, wherein the oxidation is carried out with an oxygen-containing gas.

3. The process according to claim 2, wherein the oxidation is carried out with a flue gas containing about 7 to 13 volume percent of oxygen.

4. The process according to claim 1, wherein the oxidation is carried out in the presence of more than 0.1 volume percent of water.

5. The process according to claim 1 wherein the oxidation is carried out at a temperature of about 950° to 1100°C.

6. The process according to claim 1, wherein the oxidation is continued until the ratio of trivalent iron to total iron is at least about $$\frac{5.72a-2}{4.29a}$$

in which $a$ is the ratio by weight of iron to titanium dioxide in the ore.

7. The process according to claim 1, wherein the unhardened titanium-iron ore agglomerates are hardened, and thereafter preheated to 900°C in admixture with about 0.5 to 10 percent by weight of carbon-containing material while in contact with an oxygencontaining gas, whereby the carbon ensures that the atmosphere is non-oxidizing.

8. The process according to claim 7 wherein the carbon is consumed and oxidation is thereafter effected with a hot oxygen-containing gas.

9. The process according to claim 1 wherein the titanium-iron ore agglomerates in addition to titanium-iron ore contain at least one of iron compounds, titanium compounds and carbon-containing material.

10. The process according to claim 9, wherein the oxidation is carried out with a flue gas containing about 7 to 13 volume percent of oxygen and more than 0.1 volume percent of water at a temperature of about 950° to 1100°C, oxidation being continued until the ratio of trivalent iron to total iron is at least about $$\frac{5.72a-2}{4.29a}$$

in which $a$ is the ratio by weight of iron to titanium dioxide in the ore, the agglomerates being oxidized in admixture with about 1 to 5% by weight of carbon-containing material.

11. The process according to claim 1 wherein the agglomerates are placed on a carrier and successively carried through zones in which they are hardened, preheated in a non-oxidizing atmosphere, and then oxidized.

12. The process according to claim 1, wherein the ore contains pseudobrookite.

* * * * *